(12) United States Patent
Gaddam et al.

(10) Patent No.: US 10,038,726 B2
(45) Date of Patent: Jul. 31, 2018

(54) DATA SENSITIVITY BASED AUTHENTICATION AND AUTHORIZATION

(71) Applicant: VISA INTERNATIONAL SERVICE ASSOCIATION, San Francisco, CA (US)

(72) Inventors: Ajit Gaddam, Sunnyvale, CA (US); Selim Aissi, Menlo Park, CA (US); Taeho Kgil, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 321 days.

(21) Appl. No.: 14/303,461

(22) Filed: Jun. 12, 2014

(65) Prior Publication Data
US 2014/0373104 A1 Dec. 18, 2014

Related U.S. Application Data

(60) Provisional application No. 61/834,361, filed on Jun. 12, 2013.

(51) Int. Cl.
*G06F 21/30* (2013.01)
*H04L 29/06* (2006.01)

(52) U.S. Cl.
CPC .......... *H04L 63/205* (2013.01); *H04L 63/105* (2013.01)

(58) Field of Classification Search
CPC .. G06F 21/41; G06F 21/6227; G06F 21/6218; G06F 21/31; H04L 63/201; H04L 63/108
See application file for complete search history.

(56) References Cited

U.S. PATENT DOCUMENTS

| | | | |
|---|---|---|---|
| 7,890,530 B2 | 2/2011 | Bilger et al. | |
| 8,141,140 B2 * | 3/2012 | Wenzel | G06F 21/41 713/182 |
| 8,856,169 B2 * | 10/2014 | Zhang | G06Q 10/06313 705/2 |
| 8,984,581 B2 * | 3/2015 | Luna | G06F 21/554 726/1 |
| 2004/0044655 A1 * | 3/2004 | Cotner | G06F 21/6227 |
| 2005/0038993 A1 | 2/2005 | Zivic et al. | |
| 2010/0250497 A1 * | 9/2010 | Redlich | F41H 13/00 707/661 |
| 2011/0296430 A1 | 12/2011 | Jandhyala et al. | |
| 2014/0130127 A1 * | 5/2014 | Toole | G06F 21/60 726/3 |

* cited by examiner

*Primary Examiner* — Hadi S Armouche
*Assistant Examiner* — Paul E Callahan
(74) *Attorney, Agent, or Firm* — Kilpatrick Townsend Stockton LLP

(57) ABSTRACT

Systems, devices, apparatuses, and methods of the present invention distribute authentication across multiple users. A data sensitivity model can define the sensitivity of different types of data. When an application requests access to a particular data item, the sensitivity of that data item can be determined. If the data item has a low sensitivity, access to the data item can be granted. If the data item has a high sensitivity, the system can request authentication before granting access to the data item.

21 Claims, 9 Drawing Sheets

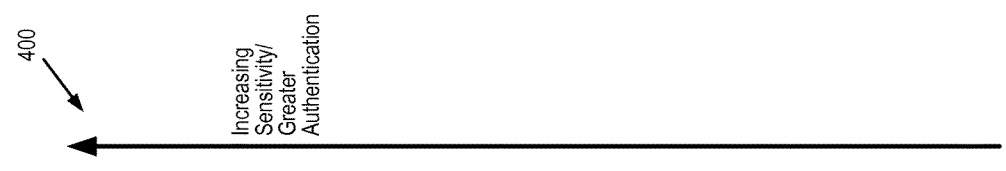

FIG. 4

| Authentication Level | DSL | Example Data | Credential Period |
|---|---|---|---|
| Trusted 402 | Highly Sensitive | - Payment Transaction Data<br>- Bank Account Data<br>- Other Highly Sensitive Data: PAN, PIN, Financial Transactions, Access Codes | - Preset Time Period<br>- Security Event |
| Private (Secure) 404 | Sensitive | - Email/Text/Call History<br>- Social Networking Data<br>- Medical Data<br>- Cache Data | - Preset Time Period<br>- Security Event |
| Untrusted 406 | Not Sensitive | - Weather Data<br>- Browser Data<br>- Music/Media | - No Credential |
| Blacklist 408 | Disallowed | - Custom Specified Data<br>- Data from Specific Sources<br>- Data Associated with Specific Apps | - No Credential |

← Increasing Sensitivity/ Greater Authentication

400

|  | Permission 1 | Permission 2 | ... | Permission N |
|---|---|---|---|---|
| User 502 | X | X | ⋮ | ⋮ |
| App 504 |  | X | ⋮ | X |
| Device 506 | X | X | ⋮ | X |

FIG. 5

DATA SENSITIVITY BASED AUTHENTICATION AND AUTHORIZATION

CROSS-REFERENCES TO RELATED APPLICATIONS

This application is a non-provisional application of and claims priority to U.S. Provisional Application No. 61/834,361 titled "DATA SENSITIVITY BASED AUTHENTICATION", filed Jun. 12, 2013, which is herein incorporated by reference in its entirety for all purposes.

BACKGROUND

Embodiments of the invention are directed to methods of providing different levels of security based on data sensitivity.

Mobile devices increasingly store highly sensitive data. Typically, access permissions are defined statically, such that access to any data requires the same type of authentication. One example of this is a lock screen on a mobile phone. Access to data on the mobile phone is controlled by the lock screen and, once unlocked, all data on the phone is typically accessible without additional authentication. Additionally, application-centric authentication can be used to control access to some data that is relevant to a particular application. For example, a mobile banking application may require an authentication step before access is granted to the mobile banking application.

Application-centric and other coarse-grained security services make no attempts to distinguish between high sensitivity data and low sensitivity data, and instead apply one-size-fits-all security policies to data requests. Such security services are unable to adapt to provide different levels of security based on the sensitivity of data to protect against the unauthorized access of sensitive data.

Embodiments of the invention address these and other problems, individually and collectively.

BRIEF SUMMARY

Systems, devices, apparatuses, and methods of the present invention distribute authentication across multiple users. A data sensitivity model can define the sensitivity of different types of data. When an application requests access to a particular data item, the sensitivity of that data item can be determined. If the data item has a low sensitivity, access to the data item can be granted. If the data item has a high sensitivity, the system can request authentication before granting access to the data item.

These and other embodiments of the invention are described in further detail below.

BRIEF DESCRIPTION OF THE DRAWINGS

FIG. 4 shows examples of data sensitivity levels for use in a data sensitivity level-based security system according to some embodiments of the present invention.

FIG. 5 shows an example of a decision table for use in a data sensitivity level-based security system according to some embodiments of the present invention.

DETAILED DESCRIPTION

Figure 1:
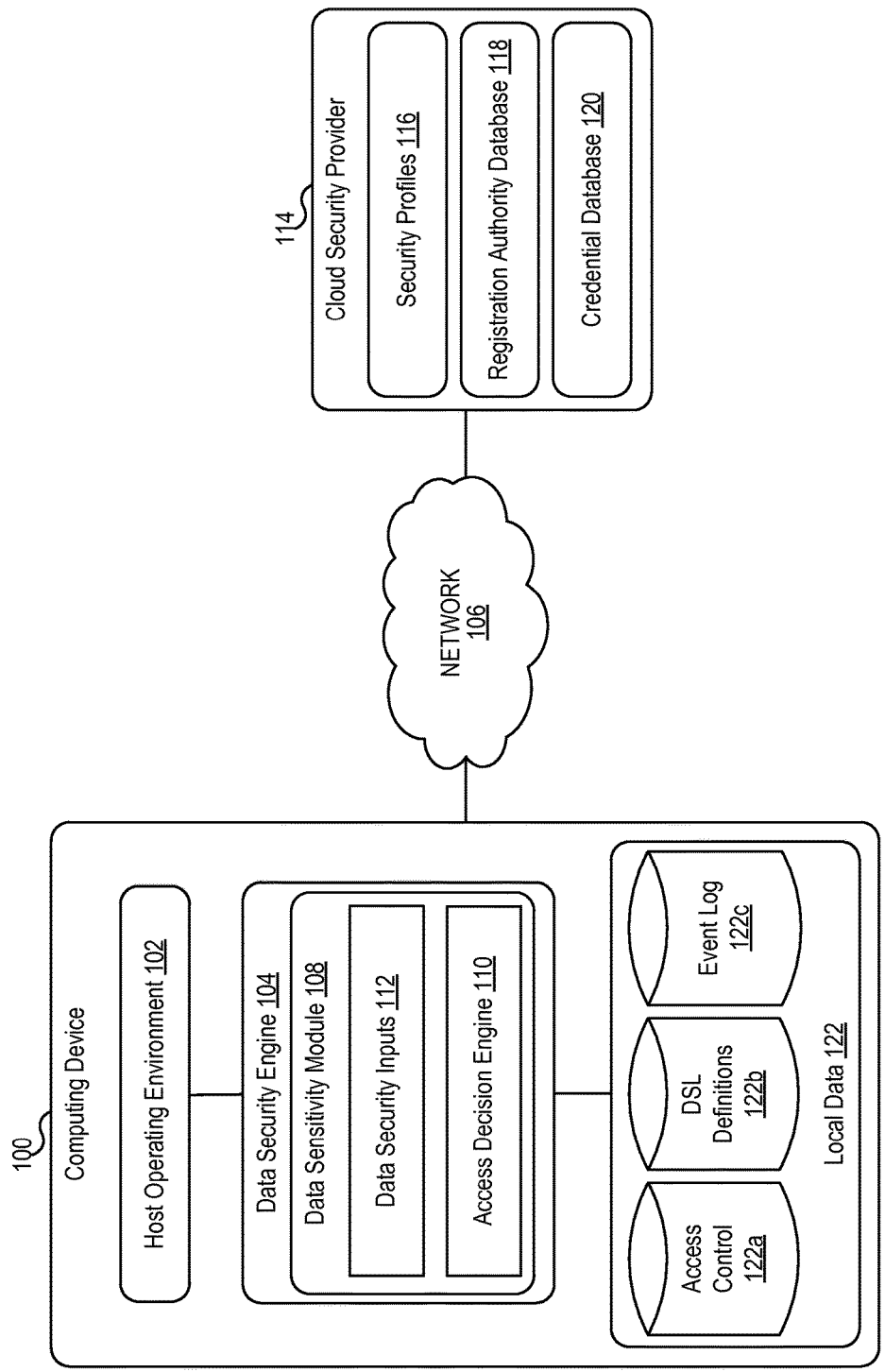
FIG. 1 shows a high level block diagram of a system providing data sensitivity-based security, in accordance with an embodiment of the invention.

Systems, devices, apparatuses, and methods of the present invention provide different levels of security based on the sensitivity of the data requested. A data sensitivity model can define the sensitivity of different types of data. When an application requests access to a particular data item, the sensitivity of that data item can be determined. If the data item has a low sensitivity, access to the data item can be granted. If the data item has a high sensitivity, the system can request authentication before granting access to the data item.

In accordance with an embodiment, a computing device, such as a mobile device or a desktop computer, can be kept in an unlocked state (e.g., without requiring authentication) and the login session can be associated with security information that provides a minimum level of privileges. As data requests are received (e.g., from users, applications, or other requesting entities) for data associated with higher sensitivity levels, the requestor can be prompted for additional levels of authentication. A registration and credential issuance module can determine data sensitivity and control access to data by prompting the user for authentication.

In some embodiments, data sensitivity can vary depending on security preferences defined by a particular user, organization, service provider, or other entity. For example, a weather application may not generally be associated with sensitive data, and weather data associated with the weather application may be accessed without requiring a password. However, if a business user checks the weather application frequently, the weather application may generate a history that effectively tracks the business user's location. The weather history data for the business user may therefore be considered more sensitive and may require a password, or other authentication, to be accessed. Such sensitivity customization may be specified by the user, e.g. during a registration phase, by an organization, such as the business user's employer, or by a service provider, such as the app developer, device developer, mobile network operator, or other entity. These customizations may be done without changing the permissions for the weather application itself, i.e., the weather application can be opened and current weather viewed without requiring any additional authentication since the current weather at the current location may be classified as having low sensitivity. When a request for the weather history is received, the system determines that the weather history data is more sensitive and can require additional authentication.

In accordance with an embodiment, a registration authority database can be maintained that manages the initial baseline data and the updating model information for authentication, including a fine-grained customization by the user of the device. The number of signals can be updated by a software update or by leveraging a cloud environment that can aggregate data from other devices using the same model.

Prior to discussing the various embodiments of the present invention, a description of some terms may be helpful for a better understanding of the disclosure.

A "computing device" may include a device that includes electronic components such as one or more processors coupled to one or more computer readable and/or writable memories (e.g., implementing one or more storage devices and/or system memories). A computing device may be used to execute one or more software applications. A computing device may also implement multiple operating environments using hardware, software, firmware, or a combination thereof for running security sensitive applications. Examples of computing devices may include computers, mobile devices, point-of-sale devices, security token devices, etc. Some computing devices such as point-of-sale devices and security token devices are specialized for conducting financial transactions.

A "mobile device" may include any electronic device that may be transported and operated by a user. The mobile device may provide communication capabilities for remote communication with a network. The mobile device may be configured to transmit and receive messages or communications to and from a server computer and display the messages on a display screen on the mobile device. Examples of mobile devices include mobile phones (e.g. cellular phones), PDAs, tablet computers, net books, laptop computers, personal music players, hand-held specialized readers, etc.

A "server" or "server computer" may typically be a powerful computer or cluster of computers. For example, the server computer may be a large mainframe, a minicomputer cluster, or a group of servers functioning as a unit. In one example, the server computer may be a database server coupled to a web server.

A "requestor" may be an entity, such as, an individual user that may be associated with one or more computing devices, an application executing on one or more devices, or any entity in communication, locally or remotely, with one or more computing devices which is operable to request access to data associated with the one or more computing devices. For example, a requestor may be a user who is able to operate a computing device to request access to sensitive data, such as by using a banking or payment application, executing on the device.

"Sensitive data" may include information that may require security protection. Sensitive data may be defined in one or more "data sensitivity levels". For example, sensitive data having a low data sensitivity level may include sensitive information associated with a user, such as Personal Identifying Information (PII) (e.g., name, home address, e-mail address, phone number, social security number, etc.), Personal Account Information (PAI) associated with a financial account (e.g., primary account number (PAN), expiration date, verification numbers or codes, etc.), Personal identification Number (PIN), or a username/password associated with other types of non-financial accounts (e.g., email accounts), etc. Sensitive data may also include device information associated with a computing device such as Electronic Serial Number (ESN), Internet Protocol (IP) address, Media Access Control (MAC) address, device identifier, device settings, geo-location information associated with the computing device, etc. Sensitive data may also include user data such as a picture or image taken by a user, an audio recording, a contact of the user, etc. Sensitive data having a higher data sensitivity level may include data or information used for cryptographic operations such as cryptographic algorithms, digital certificates, cryptographic keys, etc., and/or data resulting from a cryptographic operation such as encrypted data. Thus, sensitive data may include information that is stored or programmed onto the computing device, specifically entered into the computing device by the user, and/or information otherwise accessible by the computing device that may be used by the computing device. Sensitive data may also include execution of a code (e.g., software code of an application or operating system, firmware code, etc.). Sensitive data may be associated with other data, for example, by being mapped or linked to other assets, or by being used by the same application. For example, a PAN may be associated with a name on the account and a verification code. As described further below, what particular data is considered sensitive data, and its associated data sensitivity level, may be customized by a user or other entity.

"Data sensitivity model" also referred to herein as a "machine learning model" or "decision model" may refer to a data model that can be used to identify sensitivity associated with data. The data sensitivity model can receive a plurality of inputs, such as application permissions, user settings, and device state, and determine a data sensitivity level associated with a particular data item. The data sensitivity model can include a decision tree, access control table, search algorithm, or other process as described further below.

"Security information" may include data or information used for security operations (e.g., cryptographic operations). Examples of security information are digital certificates, cryptographic keys, etc., and/or data resulting from a cryptographic operation such as encrypted data.

As used herein, a "security policy" may include a set of rules that are used for protecting and/or managing access to sensitive data, security services, or a combination thereof. For example, a security policy may determine how sensitive data is stored (e.g., in an encrypted form or in a certain storage area), or determine how sensitive data may be accessed (e.g., authentication of a requesting entity, exchange of cryptographic messages, etc.). The security policy for an application may be tied to sensitivity of data and may be used to determine security services to provide to the application based on the sensitivity of the data.

"Authentication" or "authenticating" may be the process of proving or verifying certain information, and/or verifying the identity of the source of that information. Authentication to verify the source of information may be achieved, for example, through the use of digital certificates and/or digital signatures. The digital certificate and/or digital signature may be generated using a private key of a key pair, and may be verified using a public key of the key pair.

A "secure communication channel" may be a networking channel between two entities, such as a server computer and mobile device, that may allow the two entities to communicate with each other through a secure channel without eves dropping by a third entity, spoofing of the communication by a third entity or masquerading of the third entity as one of the two expected entities participating in the secure communication. Setting up a secure communication channel allows sensitive information such as credit card numbers, social security numbers, login credentials and signaling information for managing a secure operating environment to be transmitted securely between the two entities. Known techniques, such as secure socket layer (SSL) protocols may be used in establishing a secure communication channel.

A "payment processing network" may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, and other types of commercial transactions. In some implementations, the payment processing network may interact with applications running on a user device. The payment processing network may include a server computer. The payment processing network may use any suitable wired or wireless network, including the Internet.

An "issuer" may typically refer to a business entity (e.g., a bank) that maintains financial accounts for the user and often issues a payment device, such as a credit or debit card to the user. An "issuer" may also refer to a trusted authority that provides digital certificates used for authentication. A "merchant" is typically an entity that engages in transactions and may sell goods or services. An "acquirer" is typically a business entity (e.g., a commercial bank) that has a business relationship with a particular merchant or other entity. Some entities may perform both issuer and acquirer functions. Some embodiments may encompass such single entity issuer-acquirers. Each of the entities (e.g., merchants and issuers may comprise one or more computer apparatuses to enable communications through the communications network, or to perform one or more of the functions described herein.

"App" or "application" may include any software module that accesses, modifies, creates, or otherwise interacts with data on a mobile device. Apps can be installed and execute on the mobile device. Apps can also execute primarily in a cloud environment and interact with a user through a thin client application installed on the mobile device. Apps can interact with data stored on the mobile device, in the cloud environment, or at a remote location.

Embodiments of the present invention can be applied across various devices and applications which access, store, create, or otherwise interact with sensitive data.

FIG. 1 shows a high level block diagram of a system providing data sensitivity-based security, in accordance with an embodiment of the invention. As shown in FIG. 1, a computing device 100, such as a mobile device, desktop computer, tablet computer, laptop computer, workstation, or other device, may include a host operating environment 102 and a data security engine 104. In some embodiments, the data security engine 104 can execute in the host operating environment. In some embodiments, the data security engine 104 may execute on dedicated hardware, secure elements, or in a different hardware or software environment from the host operating environment. The data security engine can generally control access to data by managing requests for data access. These requests may be for data stored locally, such as in local data 122, or remotely, such as in remote data 124. Requests may be received from a user operating the device, such as through an application executing on the device. The requests may also be received without user involvement, from applications executing locally on the device or remotely.

In some embodiments, data security engine 104 can implement a data sensitivity-based security system. The data sensitivity-based security system can control access to data based on how "sensitive" the data. When a request to access data is received, an access decision engine 110 can evaluate one or more data security inputs 112 to determine the sensitivity level of the requested data and the current authentication level of the requestor.

For example, an application on computing device 100 can send a request to access data. The application may send the request in response to user input, such as where a user requests to view banking details, an email, or other data, or the application may send the request without user input. In some embodiments, the requested data may be stored locally, in local data 122, or may be stored remotely at a server accessible to the computing device over a network 106, such as the Internet, a WIFI network, a mobile network, ad-hoc network, or other remote connection. The data security engine 104 may receive the request and determine a data sensitivity level (DSL) for the requested data. In some embodiments, the data security engine 104 can include a plurality of listeners that monitor memory addresses, data sources, or other components that are configured to store data. The data security engine 104 can intercept requests detected by the plurality of listeners and determine whether to grant or deny access to the requested data. This allows the data security engine 104 to operate without making any changes to applications. In alternative embodiments, applications can be configured to send all requests to access data to the data security engine.

In response to the request to access data, access decision engine 110 can determine whether the DSL of the requested data is known. For example, as discussed further below, data sensitivity module 108 may cache recently or frequently accessed DSL data. If the DSL for the requested data is known, then access to the data can be provided or denied according to its known DSL. For example, if the DSL corresponds to low sensitivity, access to the data can be granted, or if the DSL corresponds to high sensitivity, authentication can be requested, depending on the current authentication level of the requestor. If the DSL for the requested data is unknown, access decision engine 110 can determine the DSL of the requested data.

In accordance with an embodiment, access decision engine 110 can include, or can access, access control data 122a. Access control data 122a can be stored locally, in local data 122, and can include a decision tree, decision table, access control list, search algorithm, or other method that can be used to determine, based on a plurality of data security inputs 112, the data sensitivity level of the requested data. For example, a decision tree may be used to distinguish between conflicting inputs, by weighting the inputs and determining which input takes precedence. As described further below, the plurality of data security inputs can include user profile information, app profile information, and device profile information. For example, in some embodiments, the plurality of data security inputs may include default permissions provided with applications, user customizations, mobile device state data, and other inputs. The plurality of data security inputs can be received from a user, app developer, mobile network operator, or other entity such as an employer or government agency.

Access decision engine 110 can then determine the DSL and based on the DSL provide access to the data. For example, as described further below with respect to FIG. 4, DSL definitions 122b can define the requirements and restrictions placed on data at each DSL. In some embodiments, if it is determined that the DSL corresponds to a low sensitivity, security information can be returned to the requestor which provides access to the data. The security information may provide access to the data indefinitely, or may be associated with a time-limited or event-limited restriction (e.g., the security information may expire after a given time period or it may expire if the computing device is placed in standby mode). If it is determined that the DSL corresponds to high sensitivity data, then an authentication request can be sent to the requestor if the requestor is not currently authorized to access the data. In some embodiments, the authentication request can be displayed to a user through an application, and the user can provide authentication credentials, such as a user name and password. In some embodiments, a requesting application may provide security information, such as a ticket or other credential, in response to the authentication request without requiring input from a user. The authentication data can be returned and, if the user is authenticated, then security information can be sent to the requestor, which can be used to access the requested data. In accordance with an embodiment, security information can be issued through a Kerberos or similar authentication protocol.

In some embodiments, when a request to access data is granted or denied, or when additional authentication information is requested, an event can be stored in event log 122c. Event log 122c provides a history of data access attempts, which may be periodically reviewed or audited by an administrator. In some embodiments, audits may be triggered by a change in request patterns. For example, if a computing device has previously only included banking and financial applications, and has therefore only recorded a history of banking related data requests, a change in request behavior from a new gaming application may trigger an audit to ensure the gaming application is not malicious.

In some embodiments, a cloud security provider 114 may manage security for a plurality of computing devices. Computing device 100 and cloud security provider 114 may communicate over a secure communication channel over network 106. Cloud security provider 114 can include aggregated security profile information 116, a registration authority database 118 and a credential database 120. Cloud security provider 114 may establish coarse-grained security profiles which may be customized during a registration process. Cloud security provider 114 can monitor customizations that are received and make changes to the security profiles in view of those customizations. Thus, cloud security provider 114 can adapt dynamically and intelligently to changing security demands by users, applications, groups of users, or other entities and propagate those changes through to all users or specific subsets of users.

Registration authority database 118 can include default data sensitivity level definitions and a default model for evaluating a plurality of data security inputs 112 to determine a DSL for a particular data item. In some embodiments, the registration authority database 118 can maintain default application settings as well as aggregate data sensitivity information associated with different applications and/or users. For example, when an application is made available to users and/or devices through an application market, the application developer can provide an initial permission manifest. The initial permission manifest can be stored in the registration authority database 118. For example, a mobile wallet application may be associated with a restrictive permission manifest, while a weather application may be associated with a permissive permission manifest. As users download and use the application, they can override the initial permissions for an application based on their own preferences, which serve as additional data security inputs that are evaluated by the access decision engine 110.

In some embodiments, as discussed further below, aggregate details of user, application, and/or device permissions customizations may be stored and analyzed by cloud security provider 114. For example, if 75% of users who download a particular application override the initial permissions with more restrictive settings, an analytics module may use this information to automatically change the permissions to be more restrictive when a user downloads the particular application (e.g., by assigning a more restrictive DSL to data associated with the application). Alternatively, the user may be prompted with the aggregate details of user customizations and asked to confirm the user's preferred settings (e.g., to ensure the user is aware that settings are being changed to be less restrictive than most users).

In some embodiments, a local version of registration authority database 118 may be stored on computing device 100, stored remotely in the cloud security provider, or both. When stored locally, on computing device 100, the database may be periodically synchronized with the cloud security provider to ensure the local database is up to date.

Figure 2:
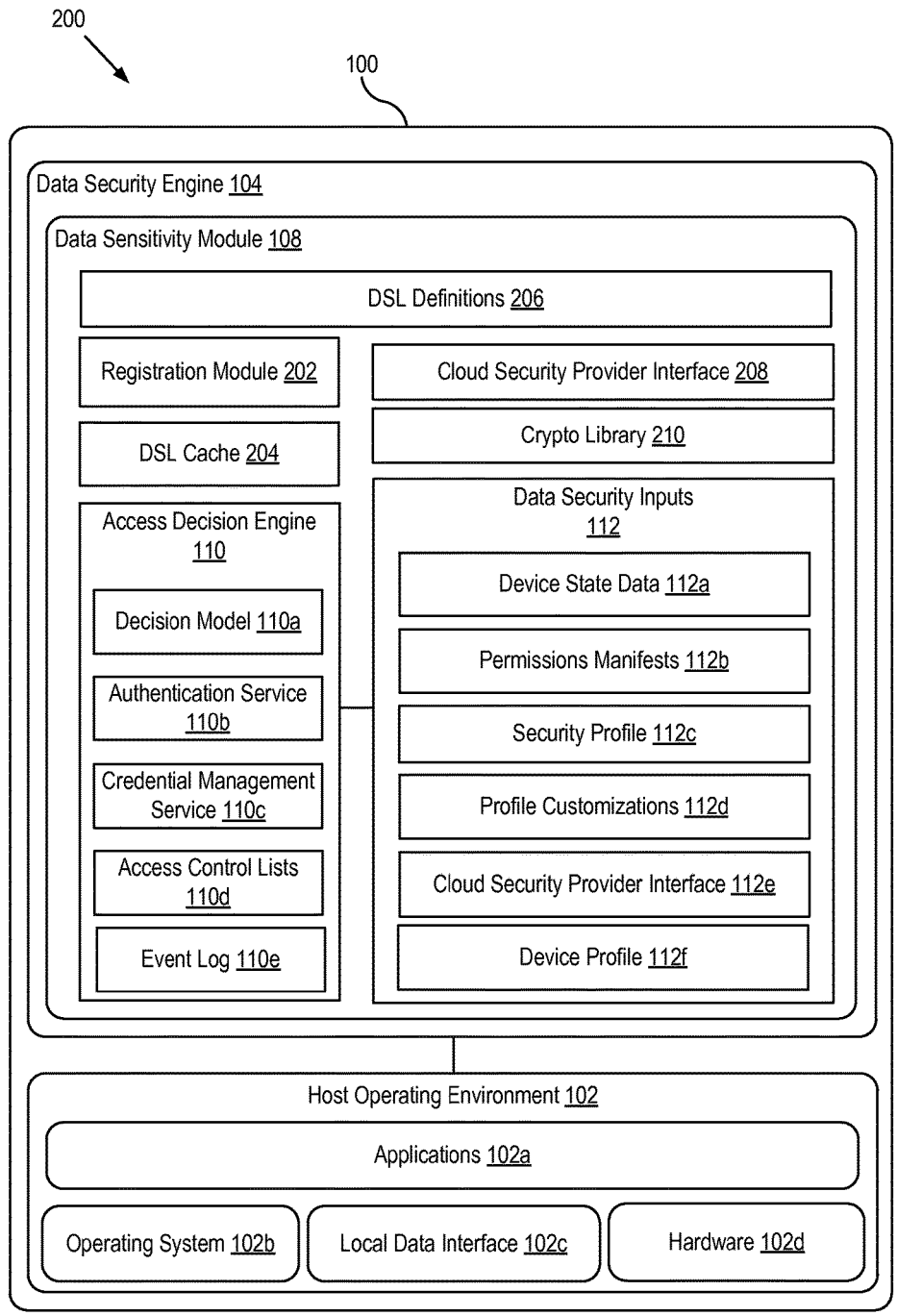
FIG. 2 shows a computing device that implements data sensitivity-based security according to some embodiments of the present invention.

FIG. 2 shows a computing device that implements data sensitivity-based security according to some embodiments of the present invention. As shown in FIG. 2, computing device 100 may include a host operating environment 102 and a data security engine 104. The host operating environment 102 may include a plurality of applications 102a, an operating system 102b, a local data interface 102c, and hardware 102d. The local data interface can communicate with one or more local data stores, such as local data 122. In some embodiments, the data stored in local data 122 may be stored separately as shown in FIG. 1, or incorporated in other hardware or software modules in the computing device. In some embodiments, the applications 102a can store application data in local data 122 through local data interface 102c.

Data sensitivity module 108 can include a registration module 202 that can be used to set up initial security profiles for users, applications, devices, and other entities. When a user or administrator first sets up a computing device for use, the registration module 202 can prompt the user to select a default security profile maintained by cloud security provider 114. Thereafter, registration module 202 may also be used to register applications as they are installed. Similarly, hardware or software peripherals that may be coupled to the computing device may also be registered by the registration module during installation. Registration of applications may be performed without user input. In some embodiments, a user may be prompted during application registration to confirm any changes to a default security profile requested by the application. This can be used to prevent malicious applications from operating in the background and gaining access to information unknown to the user.

During registration, the user or administrator may be prompted to provide a security credential, such as a username and password, or to generate a new security credential. In some embodiments, where the computing device is provided through a corporate entity, such as a government agency or company, the user may be prompted to provide a security credential associated with the corporate entity. The registration module may then communicate with the cloud security provider 114, through cloud security provider interface 208, to obtain one or more default security profiles from which the user may select. The security profiles may be generated by the cloud security provider 114 or may be defined by the corporate entity. The user may be further prompted to customize a security profile, to provide greater to lesser security to particular data items or types of data. For example, the user may choose to increase the sensitivity level of all data associated with an email client application, or may choose to increase the security of a weather history file associated with a weather application. The selected default security profile and profile customizations may be stored and used as data security inputs by the access decision engine 110 when determining whether to allow access to requested data.

As shown in FIG. 2, data security inputs 112 can include device state data 112*a*, which may include device location (e.g., identified using the device's GPS module), lock/unlock state, login state, and other device state information. Permissions manifests 112*b* can include permissions manifests associated with applications 102*a*. The permissions manifests can be provided with the applications when the applications are installed on the computing device and can represent initial or default permissions associated with each application. Security profile 112*c* can include security levels generated by cloud security provider 114. The security profiles may be based on a role associated with the user or the security capabilities of the computing device. Additionally, the security profile may be set by a device provider (such as a mobile network operator, employer, or other entity), or by the user during registration. Profile customizations 112*d* may include specific overrides received from a user, application, or other entity. For example, the profile customizations may allow specific exceptions to be defined in the security profile, to provide greater or lesser security to particular data items. For example, data that is associated with a low sensitivity according to the security profile (such as weather history data) may be more sensitive to a user or group of users. For example, a CEO of a corporation may designate their weather app history as sensitive data as it corresponds to their travel history. Similarly, weather history may correspond to troop movements where multiple members of a military group include the same app. As such, organizations such as the military or a corporate entity may designate the weather app data as sensitive and push those security customizations to the computing devices associated with each user of the organization.

When a request to access data is received from one of the applications 102*a* on the device or a remote application, access decision engine 110 can evaluate the request in view of the data security inputs to determine whether to grant or deny access to the requested data. Access decision engine 110 may include a decision model 110*a*. The decision model can evaluate the data security inputs 112 to determine whether to grant or deny access. The decision model can determine the DSL of the requested data using a decision table, decision tree, or other model to evaluate the data security inputs. For example, a hierarchy may exist based on the who provided the input (e.g., a customization from an employer may not be overridden by an employee except to make the data more secure). Similarly, using device profile data security inputs, access from one device data may have a low sensitivity level whereas from a different device it may have a high sensitivity level. In some embodiments, the data security inputs may be analyzed by assigning a weight to each of the plurality of inputs, identifying one or more of the plurality of inputs having a highest weight; and determining the data sensitivity level associated with the one or more of the plurality of inputs having the highest weight. Alternatively, the weighted values may be summed and the sum compared to a data sensitivity scale that determines the DSL of the data.

Once the DSL of the requested data has been identified, the DSL can be compared to an authentication level associated with the request. In some embodiments, the authentication level may be determined from security information provided with the request (such as a credential or security ticket). If the authentication level of the request is not enough to provide access to the data, authentication service 110*b* can prompt the requestor for additional authentication information. In some embodiments, authentication service 110*b* can cause the computing device to display a request for a username and password, PIN, or other data. In some embodiments, authentication service 110*b* can send a request to an external and/or third party authentication service to obtain additional authentication information. When new authentication information is received, credential management service 110*c* can verify the authentication information and, if authentic, issue new security information that allows access to the requested information. Access decision engine may also maintain access control lists (ACLs) 110*d*, role-based access control (RBAC) or other access control system data. In some embodiments, a third party, such as a government agency, corporate entity, or other group, may provide the access control data. Access decision engine 110*e* may also include, or have access to, event log 110*e*. As described above, event log 110*e* may maintain information related to each data access request received, including an identifier associated with the requestor, the requested data, whether the request was granted or denied, and other related information. This allows for a data request history to be reconstructed for auditing purposes.

As shown in FIG. 2, in some embodiments, data sensitivity module 108 can include DSL cache 204. DSL cache 204 may be used to store DSLs for recently, or frequently requested, data for faster access decisions. The cache can periodically request updates to DSLs from the cloud security provider 114 for the frequently accessed data and update any changed DSLs accordingly. Alternatively, cached DSLs may be periodically marked stale and, when a subsequent request for a data associated with a stale DSL is received, the DSL can be determined and updated. In some embodiments, DSLs stored in DSL cache 204 may be hashed or encrypted to limit access to the DSL data to the data sensitivity module 108. In some embodiments, DSLs stored in the DSL cache may be associated with a DSL, and a request to access cached DSL data may first require authentication of the requestor. Encryption and hash algorithms, cryptographic keys, and decryption information can be stored in crypto library 210.

Figure 3:
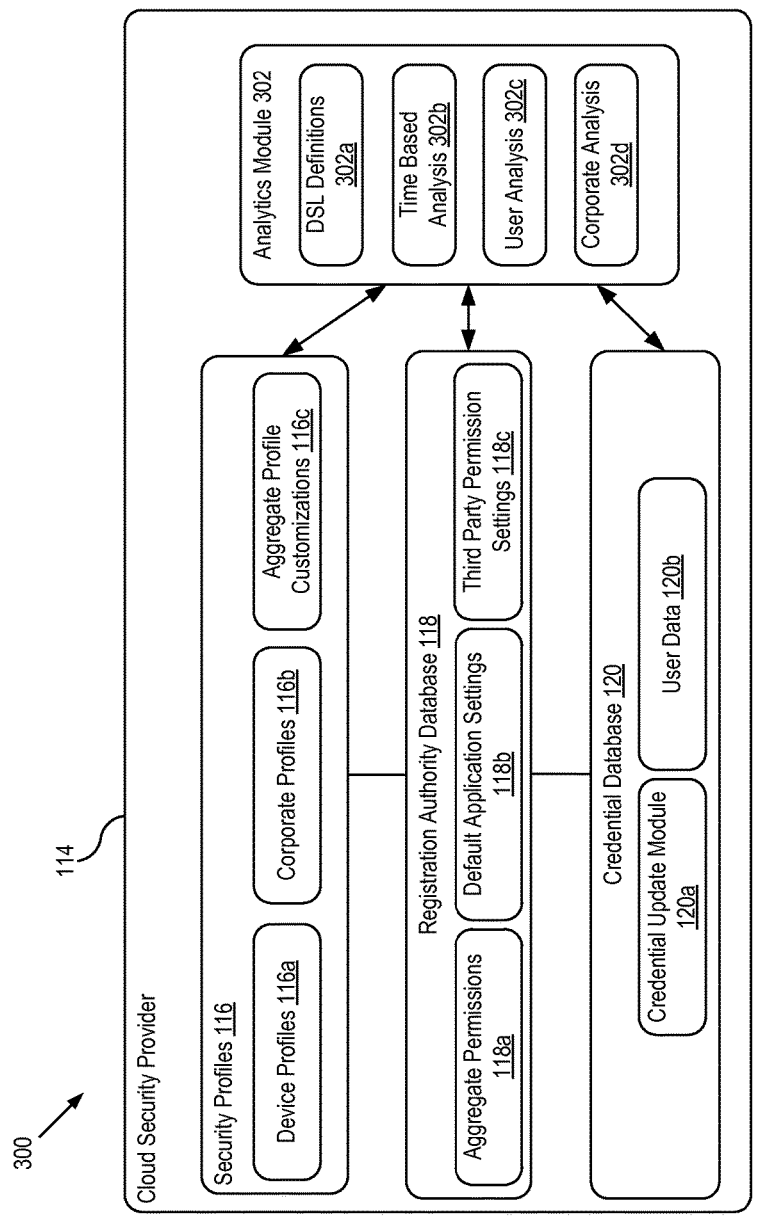
FIG. 3 shows a cloud-based security provider computer according to some embodiments of the present invention.

FIG. 3 shows a cloud-based security provider computer 300 according to some embodiments of the present invention. As shown in FIG. 3, cloud security provider 114 may maintain security profile information 116 including device profiles 116*a*, corporate profiles 116*b*, and aggregate profile customizations 116*c*. Device profiles 116*a* may include different security settings for different types of devices. For example, desktop or workstation computers may have different device profiles and security capabilities than a smartphone or tablet computer. Corporate profiles 116*b* may include particular security settings for different organizations supported by the cloud security provider. For example, government agencies may have different security requirements than private companies. Corporate profiles may further include different profiles for different subsets of any given entity, depending on how the entity is organized. This way, existing RBAC, ACL, or other access control rules that are implemented by an organization can be imported by the cloud security provider 114. This allows enterprise-wide, consistent security services without requiring the cloud security provider or the corporate entity to recreate existing rules systems. In some embodiments, aggregate profile customizations 116c may be maintained by the cloud security provider 114 with the security profile information 116. Aggregate profile customizations can include a record of all changes made to the security profiles by an end user or application.

Registration authority database 118 may include aggregate permissions 118a, default application settings 118b and third party permission settings 118c. Aggregate permissions 118a can monitor the default settings for particular data items, types of data, or applications. When a profile customization is received, it can be compared to the aggregate permissions to determine whether it is within permitted bounds or whether additional authentication or authorization is required before allowing the customization. For example, if the customization is only present in ten percent of users profiles, the user may be prompted before implementing the customization. Default application settings 118b can include aggregated permissions manifests associated with any or all applications supported by cloud security provider 114. This may include applications associated with a particular application market, device, or organization. Third party permission settings 118c may include specific permissions settings from corporations, agencies or other organizations. For example, explicit allow and explicit deny permissions may be maintained in third party permission settings 118c, which may allow for overrides of preexisting corporate profiles without the need to update the corporate profiles.

Credential database 120 may include a credential update module 120a that allows users to recover and/or change their security credentials (e.g., if lost, forgotten, or compromised). Credential database 120 may also include user data 120b which may include data associated with a user, such as Personal Identifying Information (PII) (e.g., name, home address, e-mail address, phone number, social security number, etc.), Personal Account Information (PAI) associated with a financial account (e.g., primary account number (PAN), expiration date, verification numbers or codes, etc.), Personal identification Number (PIN), or a username/password associated with other types of non-financial accounts (e.g., email accounts), etc. User data 120b may include an aggregate of data from many different users. In some embodiments, user data 120b may be stored in segregated data stores depending on the organization to which a user belongs. For example, government agency employee data may be stored in one data store and a corporation's employee data may be stored in a separate data store.

Analytics module 302 may interpret the security profile data 116, registration authority database 118, and credential database 120 to dynamically adapt existing security profiles in view of changing security demands. Analytics module 302 can maintain current DSL definitions 302a, which pay be periodically synchronized with computing devices, such as computing device 100. By monitoring aggregate profile customizations 116c, updates to the DSL definitions can be "crowdsourced" enabling the DSLs to be updated more quickly than they may otherwise be in view of changing security requirements or expectations. Such analyses can be performed in a number of different dimensions. For example, time based analysis module 302b can track aggregate profile customizations for each data item, data type, or application over time. This data may be visually represented as a scatter plot, with time on one axis and custom security level on the other axis, allowing the security trends to be visualized. User analysis module 302c may track a total number of users who have changed a security level. User analysis module 302 may also track subsets of users within organizations. For example, if three quarters of the sales team of a corporation changes their weather data security settings, the sales team security profile can be updated to automatically increase the security settings accordingly. Corporate analysis module 302d may compare settings across different organizations and may make recommendations to update a company's security policies if the policies are not in line with the company's competitors.

As an example, data associated with a weather app is by default associated with a "not sensitive" DSL. If the weather app data is monitored and it is determined that an increasing number of users are changing the data permission to "sensitive" the analytics module 302 can update the DSL definitions to reflect that change. Thresholds may be defined that trigger automatic DSL updates (e.g., number of users changing, velocity of users changing, etc.) or to automatically alert an administrator to consider updating their DSL definitions or security profiles.

FIG. 4 shows examples of data sensitivity levels for use in a data sensitivity level-based security system according to some embodiments of the present invention. Chart 400 shows examples of different tiers in which data may be classified based on the data's sensitivity 412, and which may correspond to different authentication levels 410. In the examples shown in chart 400, a "trusted" authentication level 402 corresponds to highly sensitive DSL, "private" authentication level 404 corresponds to sensitive DSL, "untrusted" authentication level 406 corresponds to not sensitive DSL, and "blacklist" 408 corresponds to data that may not be accessed. Chart 400 further shows example data 414 that may be associated with each DSL. For example, highly sensitive data may include payment transaction data, bank account data or other highly sensitive data such as PAN, PIN, financial transaction history, access codes, etc. In some embodiments, data associated with a particular app can be associated with the highly sensitive DSL by default, such as banking apps, password vaults, payment wallets, etc. Data associated with the sensitive DSL may include data that is less sensitive than the highly sensitive data, but that is sensitive enough that the user wants to limit access to the data. This may include email, text, and/or call history, social network data, medical data, and cached data. Not sensitive data may include weather data, music/media data, web browser data, etc. Access to this data may generally be provided without requiring additional authentication.

In some embodiments, each authentication level can be associated with different security information that may be requested from the requestor before access is granted. If the requestor already possesses the appropriate security information, it can be provided with the data request and access can be provided once the security information has been validated. If the requestor does not possess the appropriate security information, the requestor can be prompted to provide additional identification information or credential. Different DSLs may require different authentication levels. The authentication level associated with a DSL may be maintained in DSL definitions 206, and periodically updated based on aggregate changes made in DSL definitions 302a by analytics module 302. For example, highly sensitive data may require two-factor authentication, whereas sensitive data may require a PIN or password. Furthermore, the security information may be associated with one or more restrictions 416. For example, the security information that allows access to highly sensitive data may be active for a limited time period or until a predefined security event occurs. Security events may include turning the computing device off, logging out, putting the computing device in standby mode, or other changes in computing device state.

In accordance with an embodiment, the tiers shown in FIG. 4 are not statically defined. Instead, these tiers may represent an initial condition assigned to a user, device and/or application and the data associated therewith. Based on usage, user input, and other factors, the system can dynamically reclassify the sensitivity of data and change access requirements accordingly.

FIG. 5 shows an example of a decision table for use in a data sensitivity level-based security system according to some embodiments of the present invention. Decision table 500 shows an example of one way of determining a data sensitivity level of a data based on contextual information related to various security profiles 508, including a user profile 502, app profile 504, and device profile 506. Each profile can be associated with various permissions 510-514 (Permission 1, Permission 2, . . . Permission N). A given permission can correspond to particular data items, such as customizations defined by the user, application, or other registered entity. In some embodiments, decision table 500 may be specific to a particular user or group of users. In some embodiments, a user may be associated with multiple devices and data may be determined to be more or less sensitive depending on the device used. For example, on a secure mobile device, fewer data items may be classified as highly sensitive whereas from a public or untrusted computing device more data items may be classified as highly sensitive.

In accordance with an embodiment, computing device state can be used as a data security input to determine an authentication level required. For example, if the mobile device state indicates the device is located in a foreign country, an additional level of authentication may be applied to highly sensitive data, or may be applied to all data requests. In some embodiments, each box in decision table 500 may represent a binary value (e.g., grant/deny) or may represent a plurality of values (e.g., Lo, Med, and Hi. To determine a DSL for a given data item, a permission corresponding to the data item can be identified and the values of the column can be evaluated to determine the DSL. For example, the values may be summed and depending on the total, a DSL may be identified (e.g., 0-1=Highly Sensitive; 2=Sensitive; 3+=Not Sensitive).

Figure 6:
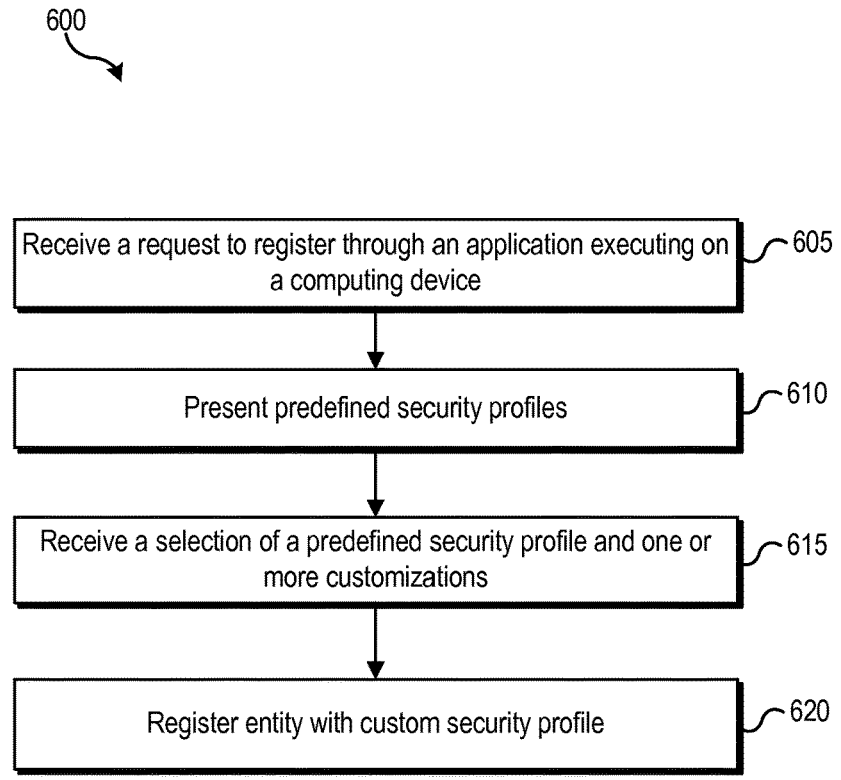
FIG. 6 shows a flow diagram of a registration process for use in a data sensitivity level-based security system according to some embodiments of the present invention.

FIG. 6 shows a flow diagram 600 of a registration process for use in a data sensitivity level-based security system according to some embodiments of the present invention. At step 605, a request to register is received through an application executing on a computing device. The request may be initiated by a user when setting up a computing device and/or by an administrator or manufacturer. In some embodiments, when an application is installed on the computing device it can automatically register with the cloud security provider and/or data security engine without being initiated by the user.

At step 610, one or more predefined security profiles can be presented. As described above, the predefined security profiles may be defined by the cloud security providers to provide default security levels. Each predefined security profile may include customization points that can be configured by the user or application to modify the predefined security profile to meet the particular security needs of the user or application (e.g., changing the sensitivity level of particular data items or types of data). In some embodiments, the customizations include a selection of data and a custom data sensitivity level.

At step 615, a selection of a predefined security profile and one or more customizations can be received. In some embodiments, the cloud security provider can compare the customizations with aggregate customizations made by other users, applications, administrators, and/or other entities. If the customizations appear in a small number of aggregate security profiles, the requestor can be prompted to confirm the customizations. For example, if the customizations appear in fewer than half of aggregate customized profiles a confirmation screen may be rendered; if the customizations appear in fewer than twenty-five percent of aggregate customized profiles, the confirmation screen may be rendered and a higher authentication level may be required. This may prevent, e.g., malicious applications from making unknown changes to default security profiles.

At step 620, the requestor is registered with a custom security profile based on the predefined security profile. In some embodiments, the custom security profile may be periodically updated by a cloud security provider server based on changes to the aggregate security profile. In some embodiments, a user may be prompted to accept or refuse the updates.

Figure 7:
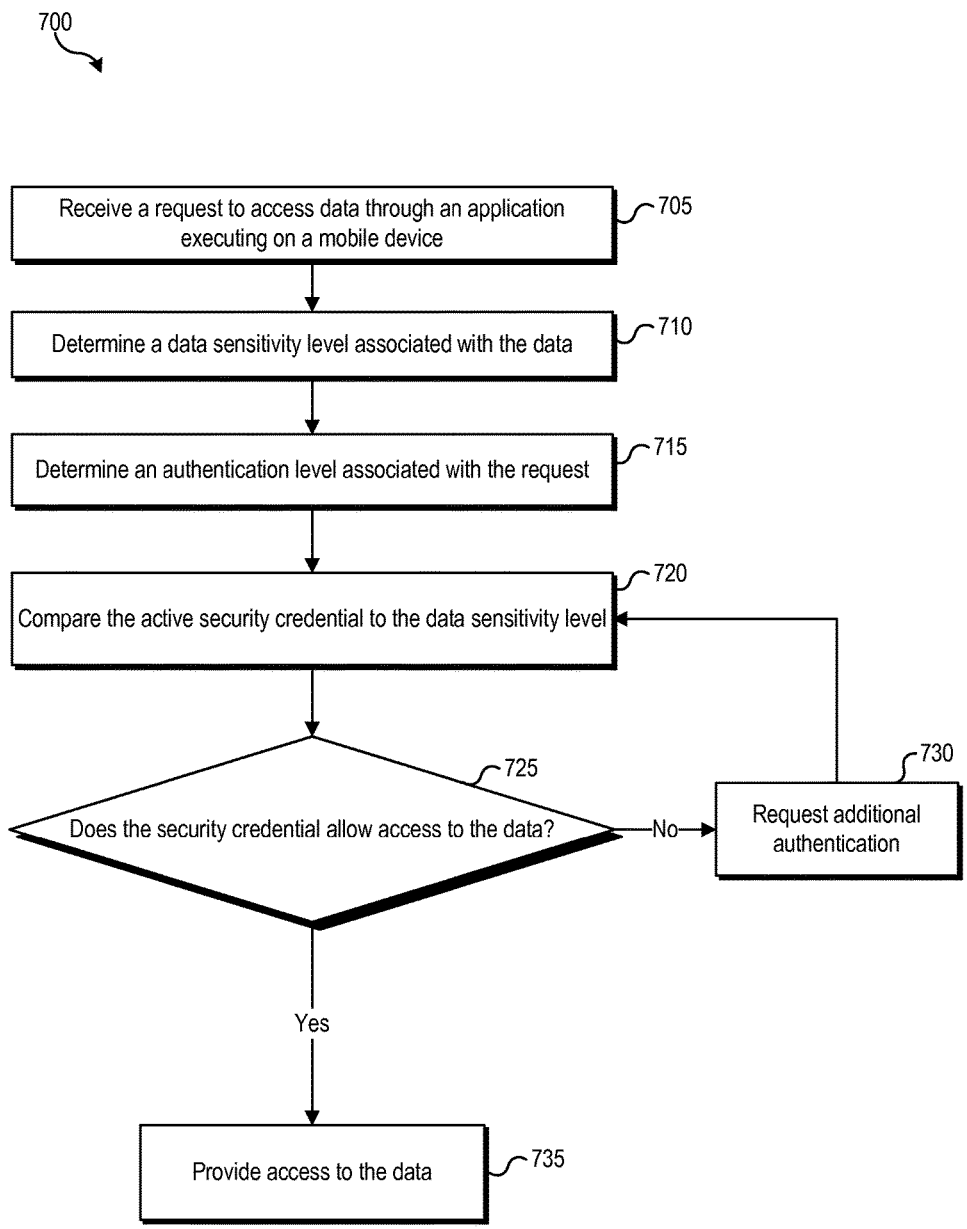
FIG. 7 shows a flow diagram of a method of controlling access to data in a data sensitivity level-based security system according to some embodiments of the present invention.

FIG. 7 shows a flow diagram 700 of a method of controlling access to data in a data sensitivity level-based security system according to some embodiments of the present invention. At step 705, a computing device including one or more processors, receives a request to access data. The request may originate with a user or may be submitted without input from the user (e.g., during installation of an application, the application may request access to particular data).

At step 710, the computing device determines a data sensitivity level associated with the data. The data sensitivity level is determined by analyzing a plurality of security inputs using a decision model. For example, the data sensitivity level may depend on the type of computing device being used, customizations defined by a user, administrator, application, or other entity. In some embodiments, the plurality of security inputs may include initial permissions associated with a requesting application; customizations; and computing device state. In some embodiments, the plurality of security inputs may be analyzed by assigning a weight to each of the plurality of inputs, identifying one or more of the plurality of inputs having a highest weight; and determining the data sensitivity level associated with the one or more of the plurality of inputs having the highest weight.

At step 715, the computing device can determine an authentication level associated with the request. For example, the requestor may be associated with security information that defines the requestor's current authentication level. For example, when a user logs into the computing device with a password or PIN, the user may be associated with security information granting access to sensitive information. In some embodiments, greater authentication levels may be obtained by providing additional authentication credentials or performing multiple factor authentication.

At step 720, the computing device can compare the data sensitivity level to the authentication level. In some embodiments, the DSL definitions on the computing device can be used to determine the authentication level required to access the data. At step 725, if the security information does not allow access to the data, then at step 730 the requestor can be prompted for additional authentication information. Once additional authentication has been received, processing can return to step 720 and the new security information can be compared to the DSL. In some embodiments, the additional authentication information requested can be based on the DSL for the requested data. For example, the authentication request can be for a security credential having a second authentication level equal to or greater than the data sensitivity level.

Returning to step 725, based on a response to the authentication request, if the security information allows access to the data, then at step 735 access to the data can be provided. If the requestor cannot provide adequate authentication information, access to the data can be denied.

Figure 8:
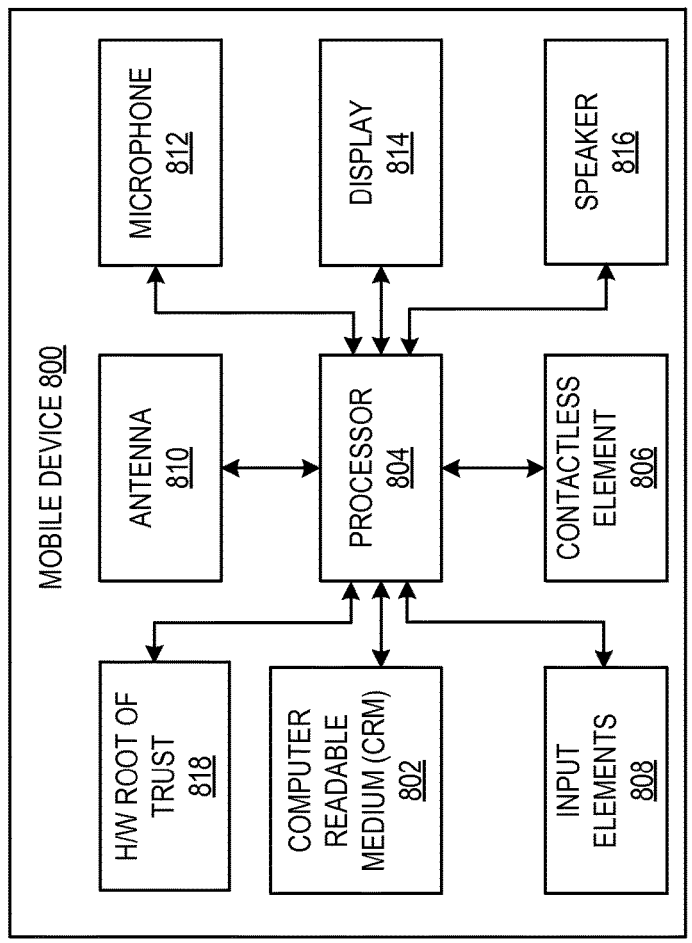
FIG. 8 shows a block diagram of a mobile device in accordance with some embodiments of the present invention.

In some embodiments, the computing device can determine the data sensitivity level of the requested data by querying a DSL cache. If the DSL for the requested data is in the DSL cache, the data sensitivity level associated with the requested data can be returned. The data cache can periodically send a request to update the data sensitivity level to an access decision module FIG. 8 illustrates at least some of the elements of an exemplary mobile device 800 in accordance with some embodiments. Mobile device 800 may be a mobile phone, a tablet, a PDA, a laptop or any such electronic device capable of communicating and transferring data or control instructions via a wireless network (e.g., cellular network, internet, etc.) and short range communications. Mobile device 800 may include the processor 804 (e.g., a microprocessor) for processing the functions of mobile device 800 (e.g., a phone) and a display 814 to allow a user to see messages (e.g., alert messages), phone numbers, images, and other information. Mobile device 800 may further include input elements 808 to allow the user to input information into the device (e.g., using a keypad, touch screen, mouse, etc.), a speaker 816 to allow the user hear voice communication, music, etc., and a microphone 812 to allow the user transmit voice through the device. Mobile device 800 may also include an antenna 802 for wireless data transfer.

In some embodiments, mobile device 800 may allow the user to communicate with one or more entities, such as the entities described in FIG. 1. Mobile device 800 may act as a payment device that may be used to make payments, conduct a transaction, a communication device to allow a user to log on to a website and download an application, etc. Mobile device 800 may also allow the user to download and install security sensitive applications on the mobile device 800. The exemplary mobile device 800 may comprise a computer readable medium (CRM) 802 comprising code executable by the processor 804 for implementing methods and processes using embodiments of the invention. The computer readable medium 802 may be in the form of a memory that stores data and could be internal to the device or hosted remotely (i.e., cloud) and accessed wirelessly by the device. A contactless element 806 may be capable of transmitting and receiving wireless data or instructions using a short range wireless communications capability.

Figure 9:
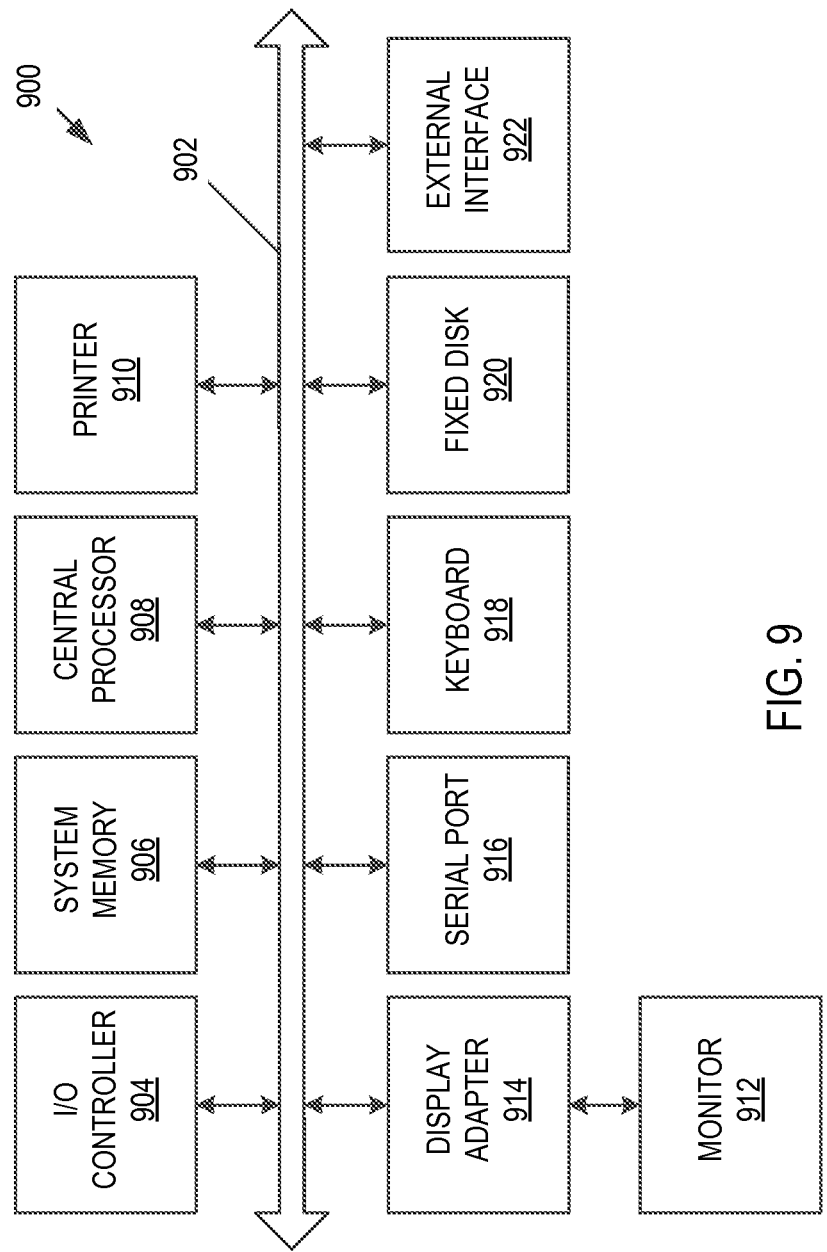
FIG. 9 shows a block diagram of a computing device in accordance with some embodiments of the present invention.

FIG. 9 is a high level block diagram of a computer system that may be used to implement any of the entities or components described herein. The subsystems shown in FIG. 9 are interconnected via a system bus 902. Additional subsystems may include a printer 910, keyboard 918, fixed disk 920, and monitor 912, which is coupled to display adapter 914. Peripherals and input/output (I/O) devices, which couple to I/O controller 904, can be connected to the computer system by any number of means known in the art, such as a serial port. For example, serial port 916 or external interface 922 can be used to connect the computer apparatus to a wide area network such as the Internet, a mouse input device, or a scanner. The interconnection via system bus 902 allows the central processor 908 to communicate with each subsystem and to control the execution of instructions from system memory 906 or the fixed disk 920, as well as the exchange of information between subsystems. The system memory 906 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

The term "machine-readable storage medium" includes, but is not limited to, portable or non-portable storage devices, optical storage devices, and various other mediums capable of storing, containing, or carrying instruction(s) and/or data. A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   receiving, by a mobile device including one or more processors, a request by a user to access data required to be used by an application executing on the mobile device;
   determining, by the mobile device, a data sensitivity level associated with the data, wherein data having a higher data sensitivity level requires a greater authentication level to access the data and data having a lower data sensitivity level requires a lower authentication level to access the data, wherein the data sensitivity level associated with the data is dependent on a plurality of security inputs, wherein the data sensitivity level varies between a first user having a first set of security inputs and a second user having a second set of security inputs different from the first user, and wherein the data sensitivity level varies according to a type of the data required to be used by the application requested by the user;
   determining, by the mobile device, an authentication level associated with the user making the request in order to access the data requested by the user;
   comparing, by the mobile device, the data sensitivity level of the data requested by the user to the authentication level associated with the user;
   determining, by the mobile device, whether the authentication level of the user satisfies the data sensitivity level required to be used by the application;
   in response to determining that the authentication level of the user is lower than the data sensitivity level for the data, sending a request to the user for authentication information;
   in response to sending the request for authentication information, receiving authentication information from the user; and
   in response to determining whether the authentication level of the user and the authentication information received from the user satisfies the data sensitivity level required for the data required to be used by the application, providing or denying access to the data required to be used by the application.

2. The method of claim 1 wherein determining a data sensitivity level associated with the data further comprises:
   querying a data sensitivity level cache for the data; and
   returning the data sensitivity level associated with the data from the data sensitivity level cache.

3. The method of claim 1 wherein the plurality of security inputs include one or more of:
   initial permissions associated with a requesting application;
   customizations; and
   mobile device state.

4. The method of claim 2, further comprising analyzing the plurality of security inputs by a decision model, wherein the analyzing further comprises: assigning a weight to each of the plurality of security inputs; identifying one or more of the plurality of inputs having a highest weight; and determining the data sensitivity level associated with the one or more of the plurality of inputs having the highest weight.

5. The method of claim 1, further comprising updating the data sensitivity level based on aggregate permission data from a plurality of users.

6. The method of claim 1, further comprising:
   determining that the authentication level is lower than the data sensitivity level; and
   sending an authentication request for a security credential having a second authentication level equal to or greater than the data sensitivity level.

7. The method of claim 6, wherein the security credential is associated with temporal limitation and a security event limitation.

8. The method of claim 2, further comprising:
   periodically requesting updates to the data sensitivity level stored in the data sensitivity level cache from a cloud security provider server.

9. The method according to claim 1, wherein the request to access the data required to be used by the application is received via the application.

10. A mobile device, comprising:
    one or more processors; and
    a memory communicatively coupled to the one or more processors, wherein the one or more processors are configured to execute instructions included in the memory to perform operations for a data sensitivity module, the operations comprising:
    a request by a user to access data required to be used by an application executing on the mobile device;
    determining a data sensitivity level associated with the data, wherein data having a higher data sensitivity level requires a greater authentication level to access the data and data having a lower data sensitivity level requires a lower authentication level to access the data, wherein the data sensitivity level associated with the data is dependent on a plurality of security inputs, wherein the data sensitivity level varies between a first user having a first set of security inputs and a second user having a second set of security inputs different from the first user, and wherein the data sensitivity level varies according to a type of the data required to be used by the application requested by the user;
    determining an authentication level associated with the user making the request in order to access the data requested by the user;
    comparing the data sensitivity level of the data requested by the user to the authentication level associated with the user;
    determining, by the mobile device, whether the authentication level of the user satisfies the data sensitivity level for the data required to be used by the application;
    in response to determining that the authentication level of the user is lower than the data sensitivity level for the data, sending a request to the user for authentication information;

in response to sending the request for authentication information, receiving authentication information from the user; and in response to determining whether the authentication level of the user and the authentication information from the user satisfies the data sensitivity level required for the data required to be used by the application, providing or denying access to the data required to be used by the application.

11. The mobile device of claim 10 wherein determining a data sensitivity level associated with the data further comprises:

querying a data sensitivity level cache for the data; and returning the data sensitivity level associated with the data from the data sensitivity level cache.

12. The mobile device of claim 10 wherein the plurality of inputs include one or more of:

initial permissions associated with a requesting application; customizations; and mobile device state.

13. The mobile device of claim 11, wherein the one or more processors are configured to execute instructions included in the memory to perform operations comprising analyzing the plurality of security inputs by a decision model, wherein the analyzing comprises:

assigning a weight to each of the plurality of security inputs;

identifying one or more of the plurality of inputs having a highest weight; and determining the data sensitivity level associated with the one or more of the plurality of inputs having the highest weight.

14. The mobile device of claim 10, wherein the data sensitivity module is further configured to update the data sensitivity level based on aggregate permission data from a plurality of users.

15. The mobile device of claim 10, wherein the data sensitivity module is further configured to:

determine that the authentication level is lower than the data sensitivity level; and send an authentication request for a security credential having a second authentication level equal to or greater than the data sensitivity level.

16. The mobile device of claim 15, wherein the security credential is associated with temporal limitation and a security event limitation.

17. The mobile device of claim 11, wherein the data sensitivity level cache is configured to periodically request updates to the cached data sensitivity levels from a cloud security provider server.

18. A method comprising:

receiving a request from an administrator to register a first user through an application executing on a mobile device;

presenting, to the administrator, one or more predefined security profiles, each of the one or more predefined security profiles including customization points that are configurable for varying a sensitivity level for a selection of data required to be used by the application executing on the mobile device;

receiving, from the administrator, a selection of a predefined security profile and one or more customizations for the customization points corresponding to the selected predefined security profile, the one or more customizations including the selection of data required to be used by the application and a sensitivity level, wherein data having a higher data sensitivity level requires a greater authentication level and additional authentication information for the first time user in order to access the data required to be used by the application and data having a lower data sensitivity level requires a lower authentication level and authentication information for the first user in order to access the data required to be used by the application, and wherein the data sensitivity level varies according to a type of the data required to be used by the application; and registering the first user with a custom security profile based on the predefined security profile and the one or more customizations, wherein the data sensitivity level for the first user indicated by the custom security profile is different from other users with different customizations.

19. The method of claim 18 wherein the one or more predefined security profiles are generated based on aggregate security profile information stored in a registration authority database.

20. The method of claim 19 wherein the aggregate security profile information is updated periodically by a cloud security provider server.

21. The method of claim 18 wherein the one or more customizations include a selection of data and a custom data sensitivity level.

* * * * *

UNITED STATES PATENT AND TRADEMARK OFFICE
CERTIFICATE OF CORRECTION

PATENT NO. : 10,038,726 B2
APPLICATION NO. : 14/303461
DATED : July 31, 2018
INVENTOR(S) : Ajit Gaddam, Selim Aissi and Taeho Kgil It is certified that error appears in the above-identified patent and that said Letters Patent is hereby corrected as shown below:

In the Claims

In Column 17, Line 59, remove "received from the user", and insert -- from the user --

In Column 18, Line 9, remove "the analyzing further comprises" and insert -- the analyzing comprises --

In Column 20, Line 19, remove "sensitivity level" and insert -- data sensitivity level --

In Column 20, Line 22, remove "the first time user" and insert -- the first user --

Signed and Sealed this
Ninth Day of October, 2018

Andrei Iancu
*Director of the United States Patent and Trademark Office*